United States Patent [19]

Martrich et al.

[11] Patent Number: 5,158,204
[45] Date of Patent: Oct. 27, 1992

[54] CONTAINMENT AND DIVERSION CAP FOR GAS CYLINDERS

[75] Inventors: Robert L. Martrich, Emmaus; Dennis W. Croll, Nuremberg; Stanley F. Christoff, Northampton, all of Pa.

[73] Assignee: Air Products and Chemicals, Inc., Allentown, Pa.

[21] Appl. No.: 832,176

[22] Filed: Feb. 6, 1992

[51] Int. Cl.[5] .............................................. B65D 53/00
[52] U.S. Cl. .................................... 220/727; 220/304; 220/724; 220/89.1; 220/89.2
[58] Field of Search ............... 220/304, 724, 725, 726, 220/727, 728, 89.1, 89.2; 215/352

[56] References Cited

U.S. PATENT DOCUMENTS

| | | | |
|---|---|---|---|
| 555,300 | 2/1896 | Browne | 220/727 X |
| 949,170 | 2/1910 | Vilbiss . | |
| 1,278,651 | 9/1918 | Heymann . | |
| 1,326,647 | 12/1919 | Cotton et al. . | |
| 1,413,502 | 4/1922 | Steinmetz | 220/727 X |
| 1,526,375 | 2/1925 | Riegel . | |
| 1,625,497 | 4/1927 | Pardee . | |
| 1,751,435 | 3/1930 | Zenner | 220/724 |
| 1,833,924 | 12/1931 | Wayer . | |
| 1,948,953 | 2/1934 | Wayer et al. | 220/727 |
| 2,178,178 | 10/1939 | McKeever | 220/89.1 |
| 2,465,095 | 3/1949 | Harvey | 220/724 |
| 2,876,926 | 3/1959 | Gronemeyer . | |
| 3,249,119 | 5/1966 | Pallack | 137/588 |
| 3,272,374 | 9/1966 | Loveday et al. . | |
| 3,323,541 | 6/1967 | Schneider et al. | 137/312 |
| 3,434,615 | 3/1969 | Barletta . | |
| 3,899,096 | 8/1975 | Marco | 215/31 |
| 4,182,361 | 1/1980 | Oakey | 137/296 |
| 4,478,345 | 10/1984 | Edinger . | |
| 4,671,421 | 6/1987 | Reiber | 215/228 |
| 4,791,952 | 12/1988 | Laurel | 137/272 |
| 4,834,137 | 5/1989 | Kawaguchi et al. | 137/557 |
| 5,052,428 | 10/1991 | Burr | 137/15 |

FOREIGN PATENT DOCUMENTS

| | | |
|---|---|---|
| 829023 | 2/1938 | France . |
| 90250 | 9/1958 | Netherlands . |
| 616091 | 1/1949 | United Kingdom . |

Primary Examiner—Stephen Marcus
Assistant Examiner—Nova Stucker
Attorney, Agent, or Firm—James C. Simmons; William F. Marsh

[57] ABSTRACT

Containment cap and adapter for mounting on a gas cylinder to isolate the cylinder valve from the ambient atmosphere and contain leakage from said valve. The cap can include means to receive inner-pressurization and remove contained leakage.

4 Claims, 1 Drawing Sheet

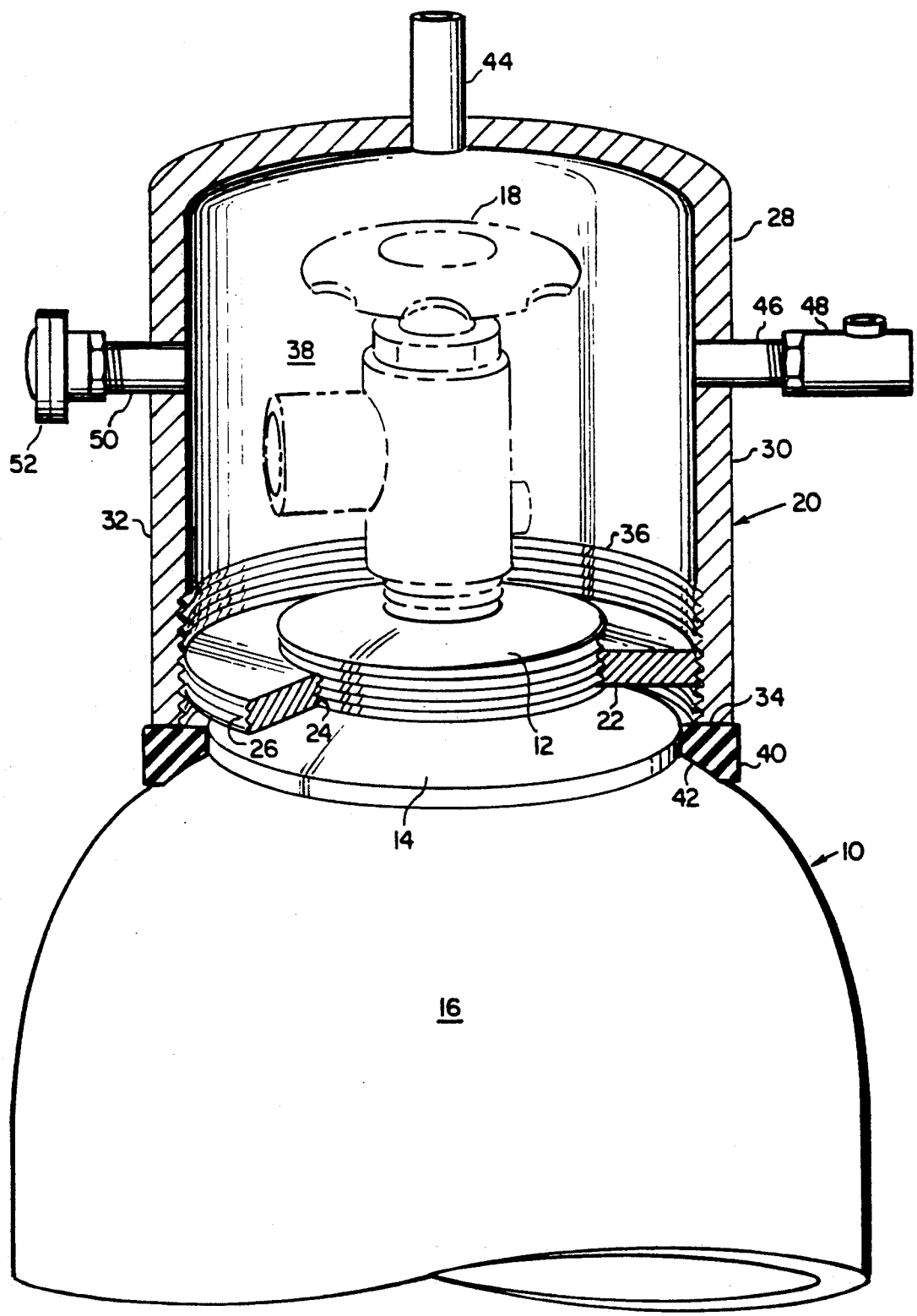

CONTAINMENT AND DIVERSION CAP FOR GAS CYLINDERS

FIELD OF THE INVENTION

The present invention pertains to caps for high pressure gas cylinders to contain leakage from the cylinder valve.

BACKGROUND OF THE INVENTION

High pressure cylinders are used to supply gas to users in locations that vary from laboratories to a hospital operating room, to remote fields, forests and mines. In addition to gases such as oxygen and nitrogen, cylinders are used to dispense gases that are toxic in nature such as chlorine, bromine, fluorine, arsine, phosphine, diborane, sulphur dioxide and hydrogen sulfide. Cylinders that contain toxic or dangerous gases can on occasion develop small leaks in the valve itself or in the connection between the valve and the cylinder that is used to fill and empty the cylinder. Small leaks can pose a hazard to persons in the vicinity of the cylinders, especially if the cylinders are contained within a room or other confined location. If a cylinder leaks, the leaks often cannot be repaired and thus the cylinders must be returned to the dispenser of the cylinders for correction. The United States Department of Transportation prohibits shipment of leaking cylinders, thus creating the problem of how to contain minor leakage so that the cylinder can be transferred in accord with regulations. Prior to the ever changing and more restrictive rules such cylinders were subjected to onsite disposal or transfer of the product. These operations are conducted by emergency response teams at the location of the problem. However, this means that equipment and personnel must be transported to the scene and measures taken to make the transfer operation safe. Many times the operation of transfer or disposal is conducted under less than ideal conditions and the operations are performed with resources that are not extensive as those normally found in the facilities of the dispenser of the cylinders.

Another option to the dispenser of the cylinders is to contain the entire cylinder inside of a leakproof package for shipment.

Containment caps, e.g. those shown in U.S. Pat. Nos. 3,323,541; 4,478,345; and 4,834,137 have been used in the industry. Cylinders are made in different sizes and in a given size can have different shapes requiring different caps for each class of cylinder. These caps were not interchangeable with other cylinders of a different class (e.g. different size or shape).

One method in use today for handling cylinders is to contain the cylinder into what is called a gas encapsulation unit which can be made leakproof and contain any leakage from the cylinder. The gas encapsulation unit can be vented through a suitable cleanup system or secondary containment system for disposal of the product contained in the leaking cylinder. However, these systems are extremely expensive and generally weigh in excess of 1,000 pounds, so they are not readily portable.

SUMMARY OF THE INVENTION

The present invention consists of a system including a gas impervious generally domed shape cap that will fit over the cylinder valve and contact the walls of the cylinder. The cap is fixed to a ring which is attached to the threaded neck of the cylinder, the ring being adaptable to various cylinder neck diameters. In combination with the ring and the cap a boot of gas impervious elastomeric material is placed on the cylinder and the cap is caused to bear against the boot to effect the seal between the boot, the cap and the outside wall of the cylinder.

BRIEF DESCRIPTION OF THE DRAWING

The single FIGURE of the drawing is a cross section of the device of the present invention fixed to a gas cylinder.

DETAILED DESCRIPTION OF THE INVENTION

Referring to FIGURE 1, a standard gas cylinder 10 is manufactured with a body 16 with a threaded neck ring 12/transition collar 14 fastened to the cylinder body 16. Cylinders used to contain gas under pressure are generally fabricated from steel and can be in varying sizes. Currently, cylinders are fabricated to contain from 10 to 600 cubic feet of gas under pressures from about 5 to 6000 psi.

A cylinder valve 18 which is used to control filling of the cylinder and subsequent withdrawal of the product from the cylinder by the user is fitted to an opening in the top of body 16 of cylinder 10. A safety cap is normally placed over the valve 18 by threading it onto the collar 12. One type of safety cap is shown in U.S. Pat. No. 1,833,924 and others are well known and are used to protect the cylinder valve during shipment. Conventional protective caps are not made gas tight and generally have apertures for permitting any leakage gas to escape. However, these caps cannot be used to contain leakage where the gas contained in the cylinder is toxic or would pose a danger if permitted to escape into a closed environment. According to the invention a gas cap assembly 20 includes a cylinder adapter plate 22 fabricated from a steel plate and is toroidal in shape, e.g. similar to a large flat washer. Plate 22 has an inner surface of the toroid or annulus 24 which is threaded with complementary threads to that of the neck ring 12 of the cylinder. On the outer surface 26 of the plate 22 is another series of threads 26, the purpose of which would be explained subsequently.

A second portion of the assembly is the containment cap 28 which is in the form of a dome with straight walls 32. The cap 28 is fabricated from a gas impervious material such as 5 inch diameter schedule 80 pipe to which a 5 inch schedule 80 cap has been welded. Containment cap 28 has an open bottom 34 and has a threaded portion 36 on the inner wall 38. Threads 36 are complementary to threads 26 on adapter plate 22. The third piece of the assembly is a boot 40 having a generally annular configuration with a portion of the inner wall 42 of annulus chambered to contact the outer wall 16 of cylinder 10.

When the plate is fixed to the cylinder and the containment cap 28 is mounted on the plate 22 and the cap rotated to force the sealing member 40 against the surface 16 of cylinder 10, a gas tight impervious seal is achieved. The sealing member 40 is preferably made of an elastomeric material such as a fluorocarbon-type synthetic rubber sold under the trademark VITON.

In order to provide maximum utility for the containment cap 28, a pipe nipple 44 can be provided to communicate with the interior of the cap 28. Nipple 44 can be used to support a valve and pressure gauge so that the internal pressure of a containment cap 28 can be monitored and material withdrawn from the containment cap 28 safely. Containment cap 28 can also be fitted with a first adapter pipe 46 and a spring loaded relief valve 48 and a second adapter pipe 50 and pressure burst disc assembly 52. The pressure relief valve 48 and the pressure burst disc 52 can be used to vent dangerous over pressurization in the unlikely event that leakage would happen where the cylinder was not monitored. Users of the invention are encouraged to connect a gas scrubbing system to the outlet of pressure relief valve 48 so that toxic or noxious gases are not permitted to enter the atmosphere.

As pointed above, the invention permits fabrication of one size containment cap for a myriad of cylinders. Merely changing the adapter plate to accommodate the threads of the cylinder makes the device universal in nature.

An apparatus according to the present invention permits containment of minor leakage from the cylinder without the expense and transport problems of cylinder overpack containment units or having numerous containment caps to fit different cylinder types. Furthermore, devices according to the invention permit wide distribution of emergency containment equipment that is easily transportable, simple to use and economically feasible even for small operations.

Having thus described our invention it was decided to be secured by letters patent of the United States is set forth in the pending claims. We claim:

1. A system for containing leakage from the delivery/fill valve on a cylinder for containing a gas under elevated pressure comprising in combination:

a high pressure gas cylinder having a neck portion adapted to receive a shipping cap placed over the delivery/fill valve mounted in fluid tight relation to the neck portion of the cylinder;

a toroidal shaped adapter plate having means on the inner surface of the torous to engage the neck portion of the cylinder that holds the shipping cap;

a generally open bottom straight walled dome shaped containment cap adapted to fit over the adapter plate and cover the cylinder valve, the containment cap fabricated from a gas impervious high pressure material, the open bottom of the containment cap adapted to engage sealing means placed against the outer surface of the cylinder;

gas impervious sealing means being a generally circular shaped ring having a tapered inner surface fabricated from a gas impervious elastomeric material adapted to contact the bottom of said containment cap and the outer surface of said cylinder; and complementary means on the outer toroidal surface of the adapter plate and the inner surface of the straight wall portion of the containment cap so that said containment cap can be fixed to said cylinder whereby the bottom of said cap can be brought into gas tight sealing engagement with the gas impervious sealing means and the outer surface of said cylinder the containment cap, the adapter plate, and the sealing means cooperating when installed on said cylinder to create a containment chamber around said cylinder valve.

2. A system according to claim 1 wherein said containment cap includes an adapter for mounting a relief valve and pressure regulator on said cap for communication with the interior of the containment chamber formed when said containment cap is in use.

3. A system according to claim 1 wherein said containment cap includes a pre-set pressure relief valve to prevent over-pressurization of the interior of the containment chamber formed when said containment cap is fixed to said cylinder with said sealing means in place.

4. A system according to claim 1 wherein said containment cap includes a burst disc pressure relief valve to prevent over-pressurization of the interior of the containment chamber formed when said containment cap is in use.

* * * * *